US007792915B2

(12) United States Patent
Berkey et al.

(10) Patent No.: US 7,792,915 B2
(45) Date of Patent: Sep. 7, 2010

(54) CONTENT DISTRIBUTION OVERLAY NETWORK AND METHODS FOR OPERATING SAME IN A P2P NETWORK

(75) Inventors: Howard Berkey, Foster City, CA (US); Payton R. White, Foster City, CA (US)

(73) Assignee: Sony Computer Entertainment Inc., Tokyo (JP)

( * ) Notice: Subject to any disclaimer, the term of this patent is extended or adjusted under 35 U.S.C. 154(b) by 1265 days.

(21) Appl. No.: 10/856,426

(22) Filed: May 28, 2004

(65) Prior Publication Data

US 2005/0198290 A1 Sep. 8, 2005

Related U.S. Application Data

(60) Provisional application No. 60/476,084, filed on Jun. 4, 2003.

(51) Int. Cl.
G06F 15/16 (2006.01)
G06F 15/173 (2006.01)
(52) U.S. Cl. ........................ 709/209; 709/224
(58) Field of Classification Search .......... 709/200, 709/239, 241, 243, 224, 209
See application file for complete search history.

(56) References Cited

U.S. PATENT DOCUMENTS

| 6,505,254 | B1 * | 1/2003 | Johnson et al. | 709/239 |
|---|---|---|---|---|
| 6,754,181 | B1 * | 6/2004 | Elliott et al. | 370/252 |
| 7,120,691 | B2 * | 10/2006 | Goodman et al. | 709/225 |
| 7,251,689 | B2 * | 7/2007 | Wesley | 709/224 |
| 7,401,132 | B1 * | 7/2008 | Krumel et al. | 709/220 |
| 2002/0116533 | A1 * | 8/2002 | Holliman et al. | 709/246 |

(Continued)

OTHER PUBLICATIONS

Li et al., "Research of Peer-to-Peer Network Architecture", pp. 312-315, Proceedings of ICCT2003, vol. 1, Apr. 9, 2003, XP010643597, Nat'l High Tech. Dev. 863 Program of China, 2001-AA-11-1-141.

(Continued)

*Primary Examiner*—Benjamin R Bruckart
*Assistant Examiner*—Gerald Smarth
(74) *Attorney, Agent, or Firm*—Martine Penilla & Gencarella LLP

(57) ABSTRACT

A method, system and architecture for operating a content distribution overlay network in conjunction with a peer-to-peer network is provided. The method includes receiving a request for content at a content node from a requesting node of the peer-to-peer network. Then, referring to an overlay network to identify the content node as a head node of the overlay network. The head node has capabilities to transcode the content. The method then identifies a lowest level child node of the head node that has capabilities to transcode the content for the requesting node. The lowest level child node is then assigned to transcode the content for presentation to the requesting node, and each parent in the overlay network is assigned to transcode the content for its child. The lowest level child node receives the content transcoded from its parent in a format of the lowest level child node, and the overlay network is independent of the peer-to-peer network. In accordance with the method, nodes of the overlay network are arranged according to capability, and the head node has a highest capability of the overlay network.

18 Claims, 8 Drawing Sheets

U.S. PATENT DOCUMENTS

| | | | | |
|---|---|---|---|---|
| 2002/0120741 | A1* | 8/2002 | Webb et al. | 709/225 |
| 2003/0018795 | A1* | 1/2003 | Ebling et al. | 709/231 |
| 2004/0054807 | A1* | 3/2004 | Harvey et al. | 709/243 |
| 2004/0107169 | A1* | 6/2004 | Lowe | 705/59 |
| 2004/0205219 | A1* | 10/2004 | Li et al. | 709/231 |
| 2006/0010203 | A1* | 1/2006 | Mrsic-Flogel et al. | 709/205 |

OTHER PUBLICATIONS

Boggs, Jr., "*Bit-String Resource Allocation Mechanism*", pp. 1667-1669, XP-002299945, NN 76101667, IBM Tech. Disclosure Bulletin, vol. 19, No. 5, Oct. 1, 1976, New York.

Hsiao et al., "*A Tree Model for Structured Peer-to-Peer Protocols*", pp. 336-343, 3$^{rd}$ IEEE/ACM Int'l Symp. on Cluster Computing and the Grid (CCGRID'03), May 12, 2003, XP010639769, IEEE, Dept. of Computer Science, Taiwan.

Hsiao et al., "*Tornado: A Capability Aware Peer-to-Peer Storage Network*", Apr. 22, 2003, pp. 72-79, XP010645600, IEEE Computer Society.

Rhea et al.,"*Probabilistic Location and Routing*", pp. 1248-1257, vol. 1 of 3, XP010593691, conf. 21, (Jun. 23, 2002), IEEE Infocom 2002, Conf. On Communications Jun. 23-27, 2002, New York.

Cardelini et al., "*Collaborative Proxy System for Distributed Web Content Transcoding*", Proc. Of 9$^{th}$ ACM Conf. On Information and Knowledge Management, 2000, pp. 520-527, XP002300702.

\* cited by examiner

CONTENT DISTRIBUTION OVERLAY NETWORK AND METHODS FOR OPERATING SAME IN A P2P NETWORK

CROSS REFERENCE TO RELATED APPLICATIONS

This application claims priority under 35 U.S.C. §119(e) to U.S. Provisional Patent Application No. 60/476,084, filed on Jun. 4, 2003 and entitled "Virtual/Real World Dynamic Intercommunication Methods and Systems," which is hereby incorporated by reference in its entirety.

BACKGROUND

1. Field of the Invention

The present invention relates to peer-to-peer networks, and more specifically to managing the efficient distribution of content over the peer-to-peer network.

2. Description of the Related Art

A decentralized computing environment is defined by a number of computing systems interconnected to communicate with one another, wherein each computing system can perform both client and server functions. A peer-to-peer (P2P) network represents a decentralized computing environment in which each computing system within the P2P network is defined as a peer of every other computing system within the network. For discussion purposes, each peer computing system within the P2P network is referred to as a node. Additionally, each node within the P2P network is configured to execute software having substantially equivalent functionality. Therefore, each node is enabled to act as both a provider and a user of data and services across the P2P network.

A common activity across a P2P network is to distribute content to certain requesting nodes of the P2P network. However, the distribution of content can be very processor intensive and can induce delays for requesting nodes to receive the content. For example, if a node requests video content, that content will have to be provided and transcoded into the format that the requesting node can use. The node that is assigned to transcode the content for the requesting node can be selected from any number of available nodes on the P2P network.

In the prior art, there are a number of techniques for assigning certain nodes to transcode content for a requesting node, however, these algorithms are typically very arbitrary and do not take into account the capabilities of the transcoding node with respect to the requesting node. Due to this arbitrary assignment, the requesting node may not obtain the content in an efficient manner, and the transcoding node may become overloaded with tasks that could have been more efficiently handled by other nodes in the P2P network.

In view of the foregoing, there is a need for a more comprehensive analysis of requesting nodes and nodes that are assigned to service the requesting nodes.

SUMMARY OF THE INVENTION

Broadly speaking, the present invention provides methods, systems and architectures for a content distribution overlay network that is used in a peer-to-peer network. The content distribution overlay network is used to enable distribution of high demand content closer to end users in an efficient manner appropriate to the capabilities of each requesting end user. It should be appreciated that the present invention can be implemented in numerous ways, such as a process, an apparatus, a system, a device or a method on a computer readable medium. Several inventive embodiments of the present invention are described below.

In one embodiment, a method for structuring a content distribution overlay network for a peer-to-peer network is disclosed. The method includes receiving a request for content at a content node from a requesting node of the peer-to-peer network. The content node has capabilities to process the content for presentation to the requesting node. The method further includes referring to an overlay network to determine if a child node of the content node has capabilities to process the content, where the content node is a head node in the overlay network. In the method, the child node is assigned to process the content for presentation to the requesting node if the child node has capabilities to process the content for the requesting node, and where the child node has lower capabilities to process the content than the head node.

A method for operating a content distribution overlay network in conjunction with a peer-to-peer network is disclosed. The method includes receiving a request for content at a content node from a requesting node of the peer-to-peer network. Then, referring to an overlay network to identify the content node as a head node of the overlay network. The head node has capabilities to transcode the content. The method then identifies a lowest level child node of the head node that has capabilities to transcode the content for the requesting node. The lowest level child node is then assigned to transcode the content for presentation to the requesting node, and each parent in the overlay network is assigned to transcode the content for its child. The lowest level child node receives the content transcoded from its parent in a format of the lowest level child node, and the overlay network is independent of the peer-to-peer network. In accordance with the method, nodes of the overlay network are arranged according to capability, and the head node has a highest capability of the overlay network.

A system for operating a content distribution overlay network in conjunction with a peer-to-peer network is disclosed. The system includes means for receiving a request for content at a content node from a requesting node of the peer-to-peer network. Means is provided for referring to an overlay network to identify the content node as a head node of the overlay network, and the head node has capabilities to transcode the content. Means for identifying a lowest level child node of the head node that has capabilities to transcode the content for the requesting node are provided, and means for assigning the lowest level child node to transcode the content for presentation to the requesting node are provided. Each parent in the overlay network is assigned to transcode the content for its child and the lowest level child node receives the content transcoded from its parent in a format of the lowest level child node. The overlay network is independent of the peer-to-peer network, and nodes of the overlay network are arranged according to capability. The head node has a highest capability of the overlay network.

An overlay content distribution tree structure is disclosed. The tree structure includes a head node capable of transcoding content from a first format to a second format and a child node of the head node. The child node is capable of receiving content in the second format from the head node, and the child node is capable of transcoding the received content from the second format to a third format. The head node and the child node are arranged according to capability and the head node has a higher capability than the child node. The head node and the child node define a multilevel parent-child overlay tree structure.

Other aspects of the invention will become apparent from the following detailed description, taken in conjunction with the accompanying drawings, illustrating by way of example the principles of the invention.

BRIEF DESCRIPTION OF THE DRAWINGS

Embodiments of the invention may best be understood by reference to the following description taken in conjunction with the accompanying drawings.

FIGS. 1B-1 through 1B-4 illustrate an example procedure for communicating content to a higher capability node for distribution, in accordance with one embodiment of the present invention.

FIG. 4 provides a pictorial illustration of the content distribution overlay network in relation to the peer-to-peer network, in accordance with one embodiment of the present invention.

DETAILED DESCRIPTION

The following embodiments define an overlay content distribution network, which is used to arrange certain nodes of a peer-to-peer network according to capability. In peer-to-peer networks, certain peers may request content from a node that may be holding the content. If this content is video data, for example, the node holding the content will be required to transcode the video data to a format of the requesting node. To assist in distributing the content to the requesting node, an overlay network is defined. The overlay network will consist of a head node that holds the content, and one or more levels of child nodes. The child nodes are nodes that can also provide transcoding services on the content.

In the overlay network, each of the nodes are arranged in a hierarchy according to capability. The more capable nodes are at higher levels and the less capable nodes are at the lower levels. The head node, will be the highest capable node. Thus, transcoding will be provided to the requesting node by the lowest level child node that is capable of transcoding to the format desired by the requesting node. Although transcoding of video content from one format to another format is described in detail, it should be understood that any processing operation may be distributed using the overlay network that is used in conjunction with a peer-to-peer network. It will be obvious, however, to one skilled in the art, that the present invention may be practiced without some or all of these specific details. In other instances, well known process operations have not been described in detail in order not to unnecessarily obscure the present invention.

Peer-to-peer networks are decentralized computing systems made up of peers, which define nodes of the network. In some exemplary embodiments, a peer can include any computing device, such as a desktop-class computer, a server-class computer, a mobile device, a hand-held device, a cell phone, a PDA, a game machine, a game console, etc. However, in other embodiments, the peer can be a computing device that is capable of establishing communication with another computing device, as long as the computing devices are connected to the P2P network.

Figure 1:
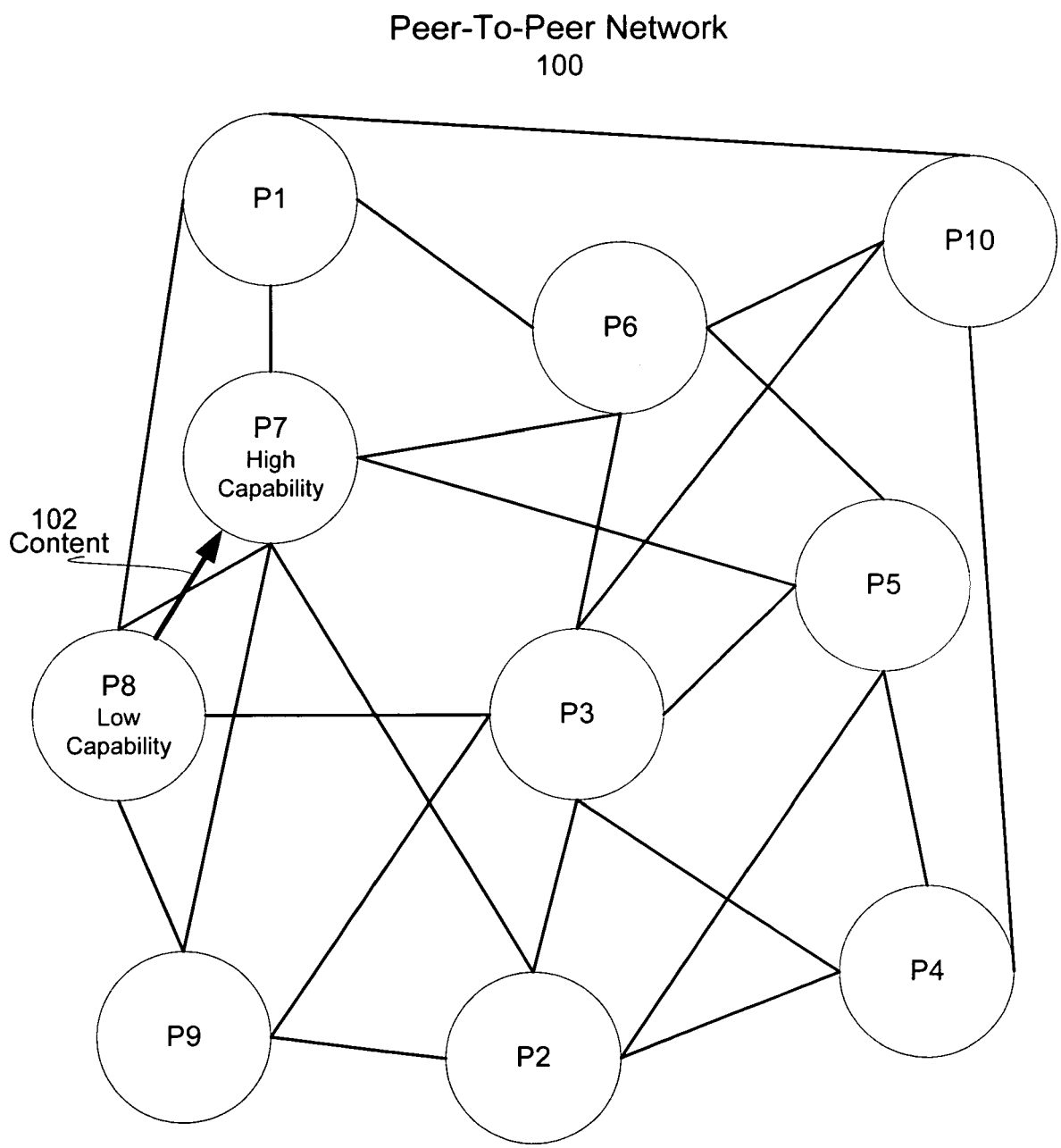
FIG. 1 illustrates an example peer-to-peer network, where certain peers have different capabilities, in accordance with one embodiment of the present invention.

In contrast with centralized computing systems, such as client/server environments, any peer in the P2P network can interact directly with any other peer in the P2P network. An example P2P network is a fully connected P2P network. FIG. 1 illustrates a peer-to-peer network 100, which is defined by a multitude of peers. For simplicity purposes, some example connections between the peers P1-P10 are drawn, although more or less connections can exist at any one time. Thus, from time to time, more or less peers will be connected to the peer-to-peer network 100. As is common in peer-to-peer networks, although the peers are interconnected, the capabilities of peers will differ. The capabilities of a peer can include, for example, processing power of the peer, network connection of the peer (e.g., high bandwidth connection or low bandwidth connection), other processing tasks of a peer, resource restrictions set by peer owners, stability of the peer, etc. As can be appreciated, there are a number of metrics that can be used to measure the capabilities of a peer.

For illustration purposes, peer P8 is identified as having low capability and Peer P7 is identified as having high capability. If peer P8 desires to efficiently share content 102, peer P8 will search for a high capability peer, such as peer P7. Peer P8 will therefore provide the content to peer P7 for ultimate distribution to other peers of the peer-to-peer network 100.

Figures 1, 1B:
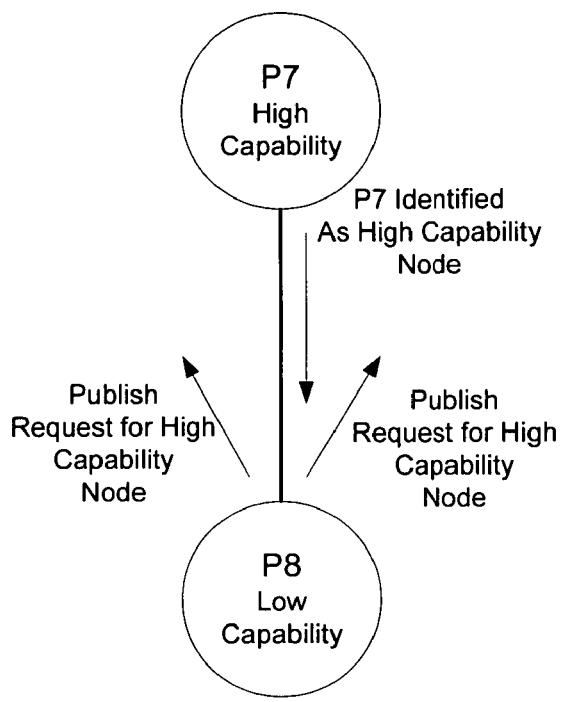

FIGS. 1B-1 through 1B-4 illustrate an example procedure that may be used to move the content from peer P8 to peer P7. In FIG. 1B-1, peer P8 may publish a request for a high capability node. Commonly there will be more than one high capability node that is part of the peer-to-peer network 100. As will be discussed below, an overlay network tree will be defined for an identified high capability node, and children nodes will be associated with the identified high capability nodes. Thus, it is possible to construct multiple overlay network trees for each high capability node. In another embodiment, multiple overlay network trees will not be constructed, but alternatively, each of the high capability nodes will be made parent and children of each other. For ease of description, in the following examples reference will be made to a single high capability peer P7, and the resulting overlay network tree for that high capability peer P7.

Figures 1, 1B, 2:
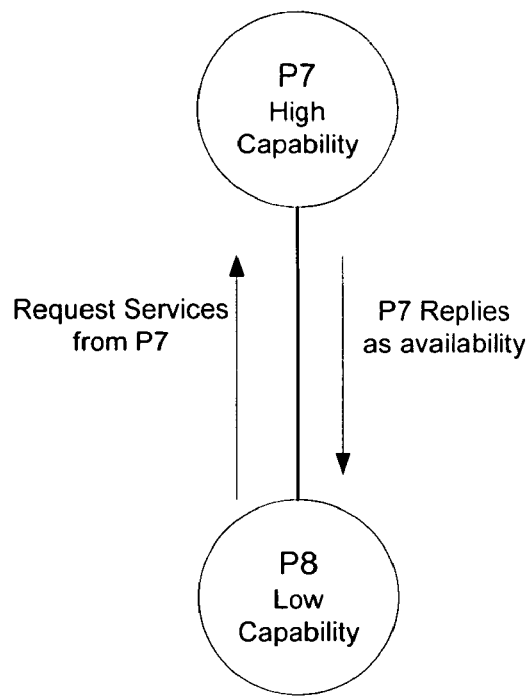
Figures 1, 1B, 2, 3:
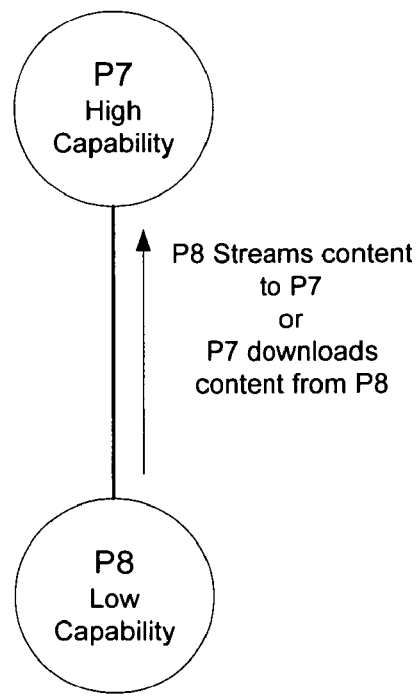

Returning to FIG. 1B-1, peer P7 identified itself as a high capability peer to the published request of peer P8. In FIG. 1B-2, peer P7 replies with information as to its availability to add the content of P8 to its distribution list. If peer P7 has availability, peer P7 will obtain the content from peer P8. The content can be provided to peer P7 by having peer P8 stream the content to peer P7 or peer P7 can simply download it from peer P8. Once peer P7 has the content in FIG. 1B-4, peer P7 will publish its availability of content, noting that it is ready to service requests for the content. If the content is video content, peer P7 will also be a node that can perform transcoding of the content from the format native to peer P7 into a format this is native to another peer.

Figure 2A:
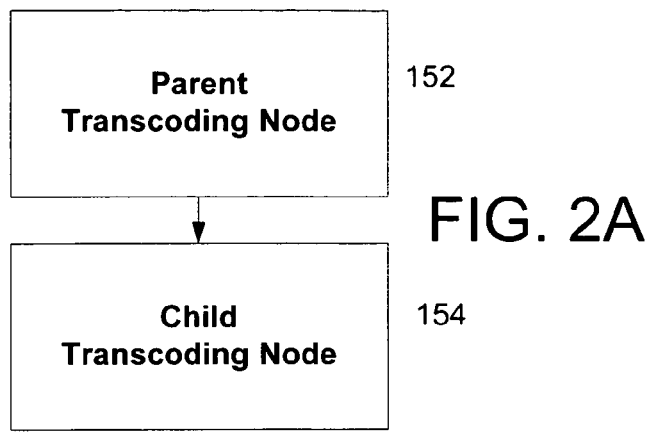
FIGS. 2A-2C illustrate examples of an overlay network structure in relation to the peer-to-peer network, in accordance with one embodiment of the present invention.

FIG. 2A illustrates a block diagram of an overlay content distribution network in accordance with one embodiment of the present invention. The overlay content distribution network is independent of the peer-to-peer network described in FIG. 1, although particular individual nodes of the peer-to-peer network define the nodes of the overlay content distribution network. The overlay content distribution network will include a parent transcoding node 152, and at least one child transcoding node 154. The parent transcoding node 152 is a node that has higher capability than its child transcoding nodes. The parent transcoding node 152 is a head node in a tree structure defined by nodes 152 and 154. In general terms, the parent transcoding node 152 is capable of transcoding content from a first format to a second format. Preferably, the second format is the format native to the child transcoding node 154. For example, the content may be video content, and the transcoding will allow the child transcoding node 154 to receive content in video format native to the child transcoding node 154. The child transcoding node 154 will therefore receive the transcoded content from the parent transcoding node 152, and will itself be capable of transcoding the content into a third format that is native to a requesting leaf node. As used herein, a leaf node is a node that receives content or services from one of the transcoding nodes or a pass-through node. A pass-through node is one that does not transcode the content, but can receive the transcoded content and pass the content to another node. With this basic definition in place, the parent transcoding node 152 and the child node 154 will define a multi-level parent-child overlay tree structure.

Figure 2B:
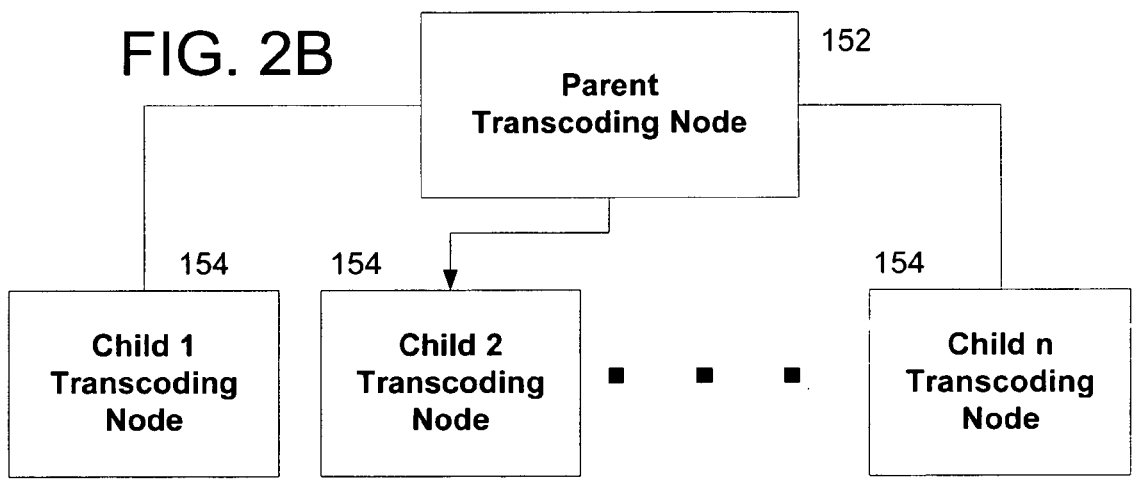

FIG. 2B illustrates an overlay content distribution network where the parent transcoding node 152 includes a number of child transcoding nodes 154. The number of child transcoding nodes 154 that may be assigned to a particular parent transcoding node 152 will depend upon the bandwidth capabilities of the parent transcoding node 152. For instance, the content being transcoded by the parent transcoding node 152 may have to be transcoded for a number of child transcoding nodes 154 that desire to receive the content. If the number of child transcoding nodes 154 grows to a larger number, the parent transcoding node 152 may not be able to provide transcoding services and the resulting content in a timely manner to each of the child transcoding nodes 154. Thus, the set of children transcoding nodes 154 will be limited in number by the ability of the parent transcoding node 154. Although only two levels of parent and child relationships have been shown with respect to the overlay content distribution network, it will be understood that the levels of parent-child relationships can be many depending upon the capabilities of the nodes that are part of a particular peer-to-peer network.

Figure 2C:
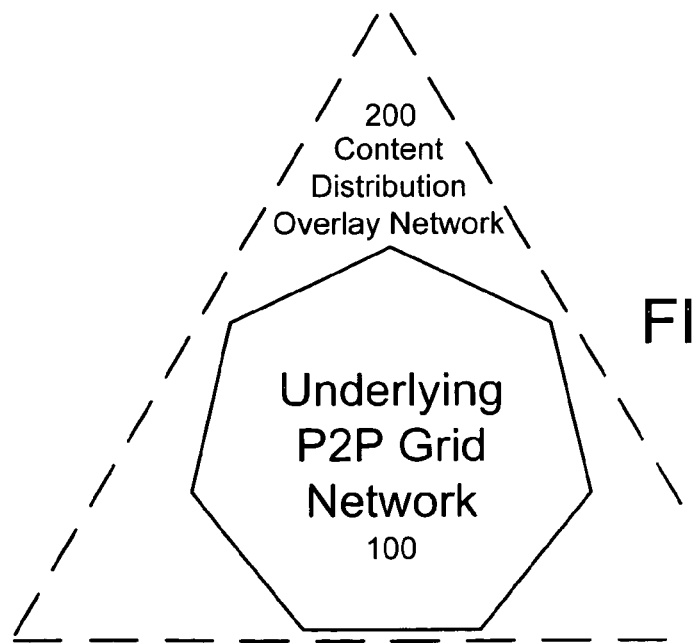

FIG. 2C illustrates a block diagram of a content distribution overlay network 200 that logically overlies a peer-to-peer network 100. The peer-to-peer network 100 will function independent of the content distribution overlay network 200. However, the content distribution overlay network 200 will be defined by peers of the underlying peer-to-peer network 100. Each of the nodes that define the content distribution overlay network 200 will be selected from the peer-to-peer network based on the capability and availability of the particular nodes. In some embodiments, but not necessary, the geographic location of nodes may define whether specific nodes get added to the content distribution overlay network.

In the examples of FIGS. 2A and 2B, the parent transcoding node 152 will have a higher capability than the child transcoding nodes 152. The larger the tree structure becomes, the organization of the child transcoding node levels will be defined such that higher levels will have higher capabilities than lower levels. In each level, there may be more than one node that has the same capability. Depending on the work load of particular child nodes, the transcoding may be delegated to selected child nodes that are less busy so that particular child nodes do not become overloaded.

Figure 3A:
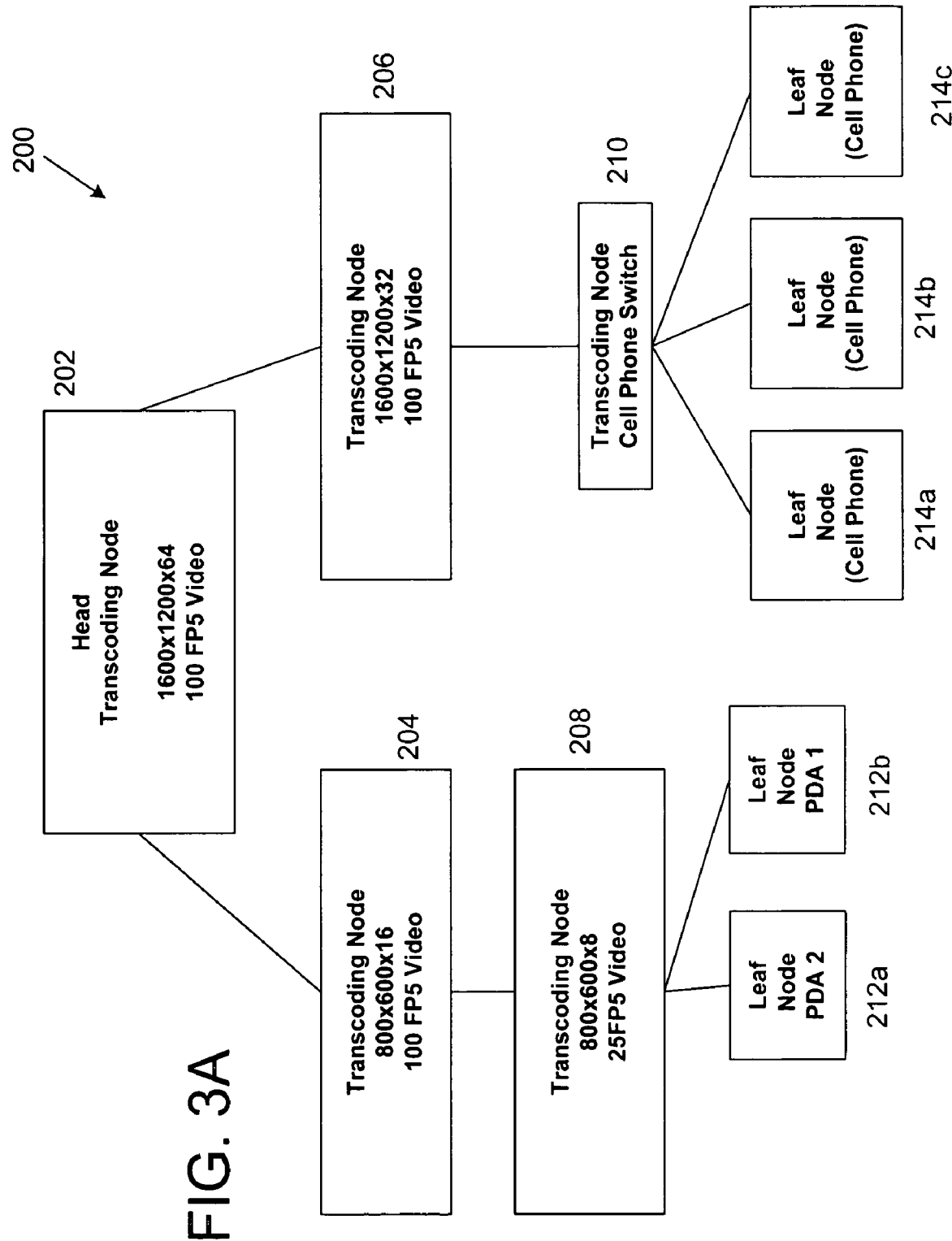
FIGS. 3A and 3B illustrate example overlay network tree structures having nodes organized by capability, in accordance with one embodiment of the present invention.

FIG. 3A illustrates an exemplary content distribution overlay network 200. In the content distribution overlay network 200, a head transcoding node 202 is defined logically above transcoding nodes 204 and 206 which have lower capabilities than the head node 202. Likewise, transcoding node 208 will have lower capabilities than transcoding node 204. Transcoding node 208 is shown servicing leaf nodes 212a and 212b, which are identified as PDAs (Personal Digital Assistants). Transcoding node 206 is shown servicing a node 210 that functions as a cell phone switch. Node 210 will then service sub-leaf nodes 214a, 214b, and 214c. Leaf nodes 214a-214c are defined by cell phones that use the services of node 210.

Thus, the content distribution overlay network 200 is defined based on capabilities of particular nodes that can provide transcoding services to a requesting node. A requesting node is part of the peer-to-peer network. The requesting node will request services and/or content from the head node which advertises the ability to distribute the content desired by the requesting node. Once a requesting node makes a request from the head transcoding node 202, the head transcoding node 202 will identify whether there is a lower child node in the content distribution overlay network 200 that can handle providing the transcoded content to the requesting node. In one example, transcoding node 204 will be capable of providing transcoding services to the requesting node, which may be viewed as leaf node 212a.

However, transcoding node 204 will in turn, determine whether a child node of transcoding node 204 is capable of providing the transcoding services to the requesting node. In this example, transcoding node 208 is a child of transcoding node 204. Transcoding node 204, being the parent of transcoding node 208, will provide transcoding services to transcoding node 208. Transcoding node 208 will in turn provide transcoding services to the leaf node that requested the content initially from head transcoding node 202. Thus, transcoding node 208 can provide the content transcoded into the format understood by leaf node 212a. In the process described, the head transcoding node has an example transcoding bandwidth of 1600×1200×64 (100FP5 video). The example lower transcoding bandwidths for the other nodes are illustrated in the figures. Thus, the head transcoding node is capable of directly providing the transcoding services to the requesting node 212a, however, the transcoding responsibility will be propagated downward from the head transcoding node 202 down to the lowest level capable child node in the content distribution overlay network 200. The lowest level child node in the content distribution overlay network 200 may in one embodiment, however, have the capability of providing the transcoding services to the requesting node in terms of bandwidth, availability, and capabilities. If no capable child node exists, then the head transcoding node can directly provide the transcoding to the requesting node.

For example, node 210 may also be a requesting node that requires cell phone switching functionality from the head transcoding node 202. The capabilities required by the cell phone switch 210 are much higher than the capabilities that would be provided by either of transcoding nodes 204 and 208. Therefore, the head transcoding node 202 could only delegate transcoding services through child node 206. Child node 206 will therefore receive transcoding services from the parent head transcoding node 202, and transcoding node 206 in turn will transcode to its child node 210. Thus, the content distribution overlay network is defined by a plurality of transcoding nodes that lie beneath the head transcoding node. Each of the children of a particular node will have lower capability than the parent node.

Accordingly, each transcoding node is organized in the content distribution overlay network tree based on its capabilities, where the lowest level node in the tree will have the lowest capabilities, and the highest level head node will have the highest capabilities. Then, based on the requesting node's capabilities and requirements, a transcoding node will be assigned to be directly providing transcoding services to the requesting node.

Figures 1, 1B, 2, 3, 4:
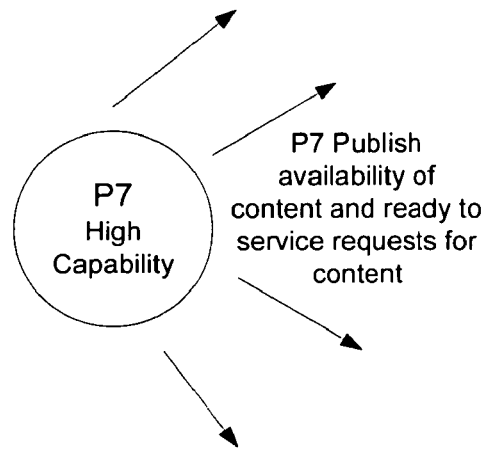
Figure 3B:
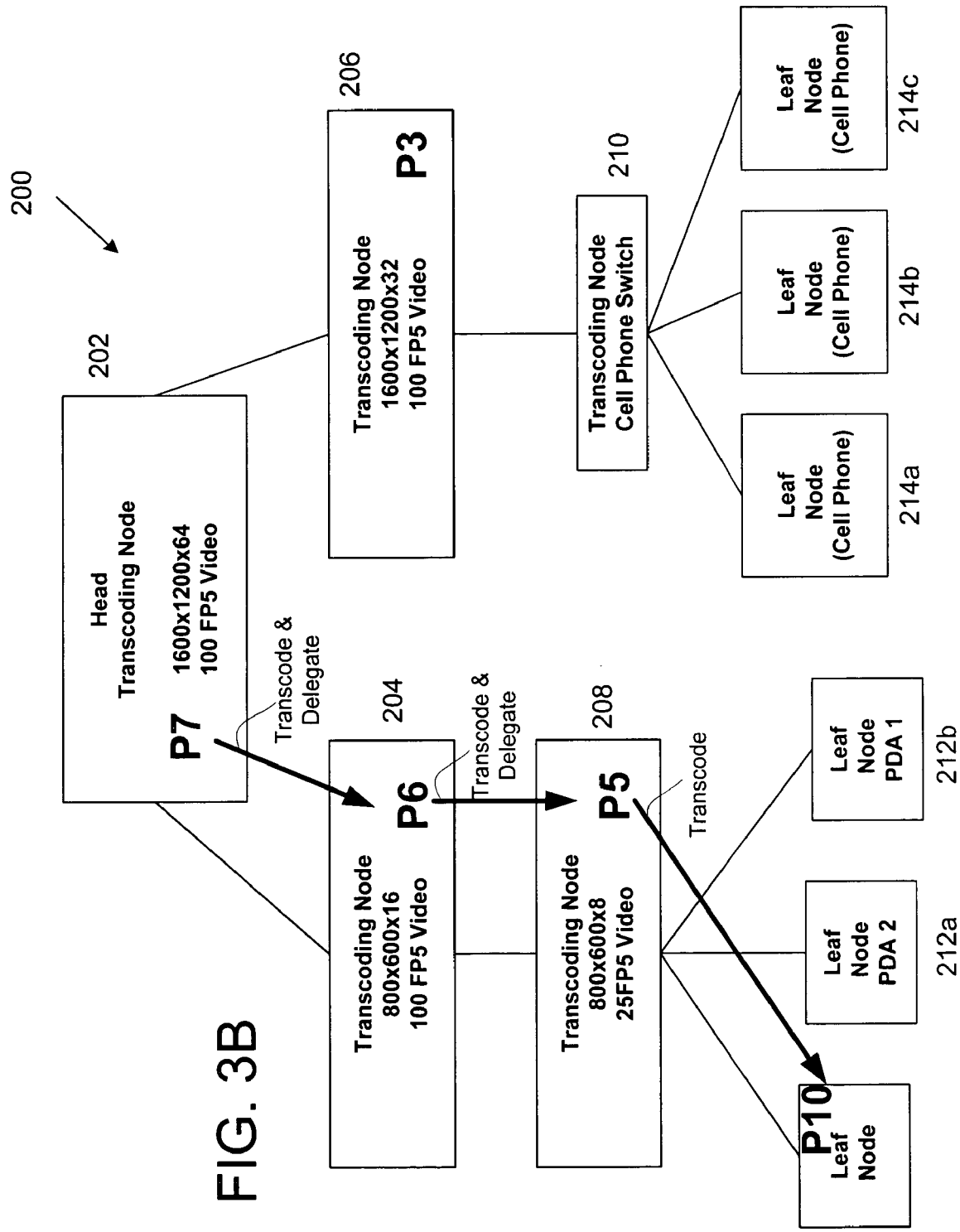
Figure 4:
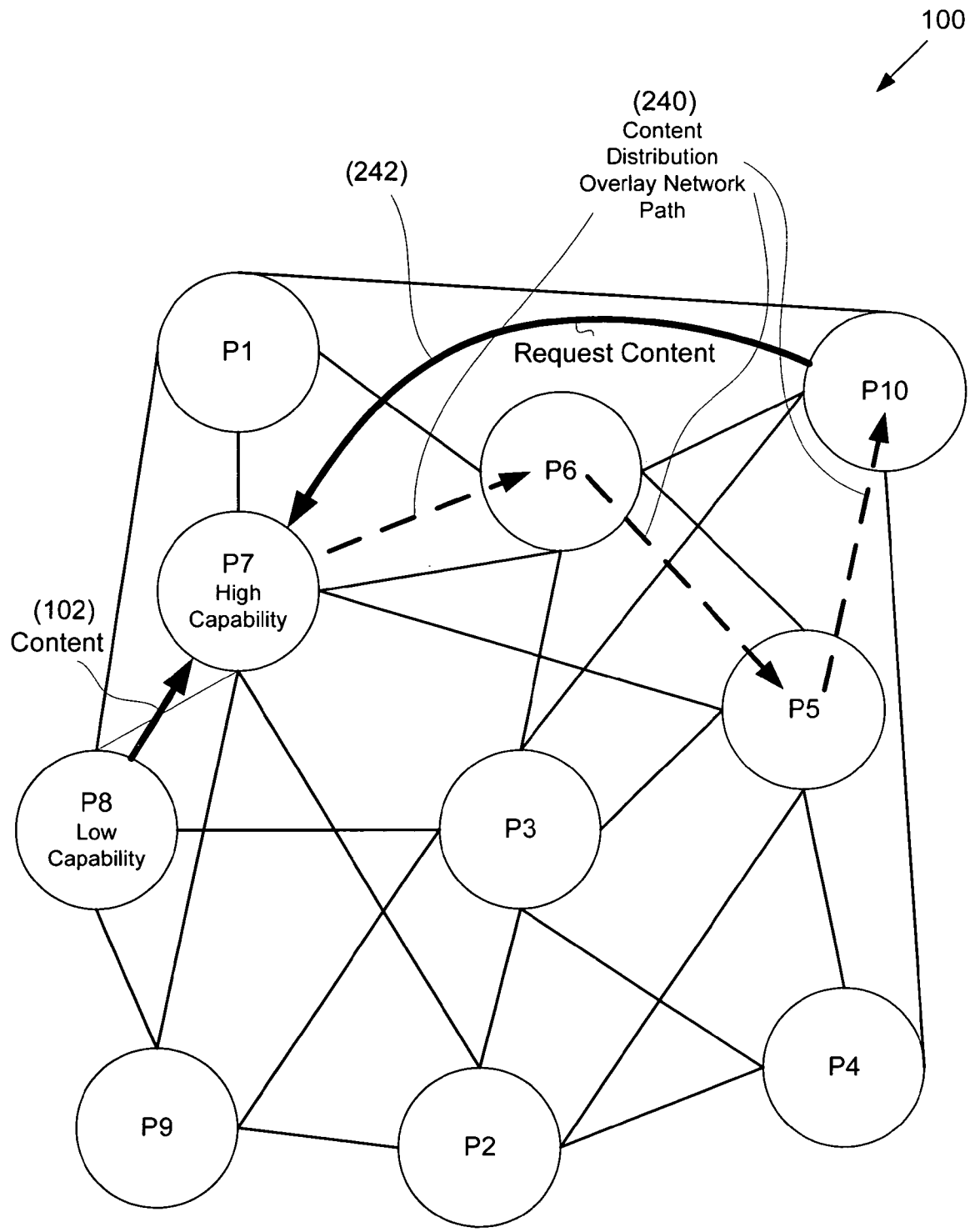

FIG. 3B illustrates a graphical representation of the content distribution overlay network 200 where the requesting peer P10, is the requesting node. In FIG. 4, peer P10 is illustrated as providing a request for content 242. The peer P10 is part of the peer-to-peer network and is the requesting node in FIG. 3B. Peer P7 is the high capability peer in the peer-to-peer network, and is also defined as the head transcoding node 202 of the content distribution overlay network 200. In one embodiment, the request that is received at the head transcoding node 202 is analyzed to determine whether the transcoding node 202 should service the requesting node directly or whether the transcoding should be delegated to a lower level node of the content distribution overlay network, depending on the capability requirements requested by the requesting node peer P10.

In this example, leaf node 212a is defined by the peer P10 node of the peer-to-peer network 100. The capabilities of the requesting node peer P10 are much lower than the capabilities of the head transcoding node 202. In this example, the head transcoding node 202 will transcode the content to the format understood by transcoding node 204. Transcoding node 204 is defined by peer P6 as shown in FIG. 4. A determination again is made by transcoding node 204 as to whether the requesting node has a lower capability than that of the transcoding node 204, and whether it is able to delegate the transcoding to a lower level child node of transcoding node 204. In this example, transcoding node 204 (defined as peer P6 in FIG. 4), will delegate direct transcoding to transcoding node 208 that is defined as peer P5 in FIG. 4.

Once transcoding node 208 has received the transcoded content from transcoding node 204 (peer P6), transcoding node 208 will again determine whether direct transcoding services should be delegated to a lower level node to enable transcoding for the requesting node peer P10. In this example, peer P5, which is defined by transcoding node 208 will be the lowest level child node that is capable of transcoding the content for the requesting node peer P10. Thus, transcoding node 208 (defined by peer P5 in this example), will perform the transcoding of the content into the format requested by the requesting node peer P10 (leaf node 212a).

As shown in FIG. 4, the content that was provided by peer P8 to peer P7 for distribution was then distributed to the requesting node, peer P10. However, the transcoding services for peer P10 will not directly be provided by the high capability peer P7. Alternatively, the transcoding services provided to peer P10 were provided by the lowest level child node in the content distribution network that is capable of providing transcoding services to the level requested by the requesting node. Therefore, the transcoding services were distributed among a number of nodes in the content distribution overlay network and are defined by the content distribution network path 240 in FIG. 4.

Delegation, as used herein, does not mean that a node will simply pass the content through, but delegation means that a node will transcode the content and then pass the transcoded content for a lower child node where transcoding may again take place at a lower capability. Consequently, in the example, the high capability peer P7 will simply transcode the content to a lower level capability format understood by peer P6, and peer P6 will transcode the content to a lower capability level understood by peer P5, and peer P5 will transcode information to the lower capability level requested by peer P10. However, if peer P10 had a capability that was higher than peer P5, but still lower than peer P6, then peer P10 would have received transcoded content from peer P6 directly. Thus, the distribution of content across the peer-to-peer network will be managed according to the capability hierarchy defined by the content distribution overlay network, which is independent of the connections defined by the peer-to-peer network 100.

Figure 5:
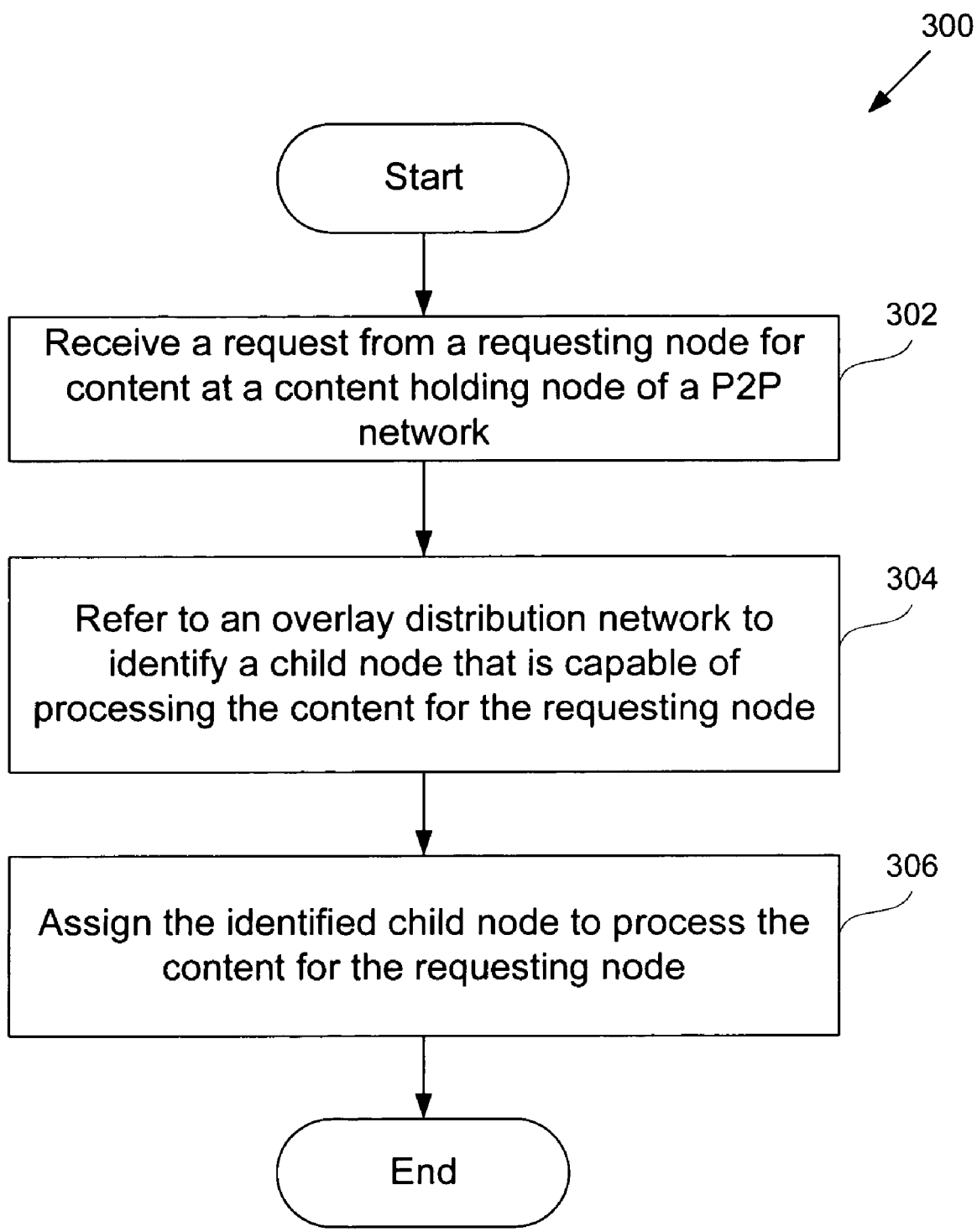
FIGS. 5 and 6 provide example flow charts of the method operations performed in functional examples of the present invention.

FIG. 5 illustrates a flowchart diagram of the method operations performed by a system that utilizes the content distribution overlay network in conjunction with a peer-to-peer network. The method begins in operation 302 where a request from a requesting node is received for content at a content holding node of a peer-to-peer network. The content holding node is assumed to be a node that is capable of distributing the content. A node that is capable of distributing the content should be a high capability node, such as node P7 in FIG. 1. The requesting node can be any node that is part of the peer-to-peer network that desires to obtain the content from the content-holding node.

The method then moves to operation 304 where upon the receipt of the request, reference is made to an overlay distribution network to identify a child node that is capable of processing the content for the requesting node. As mentioned above, if a child node of the content holding node is capable of providing the processing of the content for the requesting node, the content-holding node will delegate additional processing to the child node in the overlay distribution network. As mentioned above, the overlay distribution network tree structure is independent of the peer-to-peer network, and the overlay distribution tree is defined by at least a parent node that is capable of processing a request for content and a child that has less capability than the parent node, and is also capable of processing the request for content from a requesting node. As used in this method, the processing can include, for example, transcoding of video content.

The method now moves to operation 306 where the identified child node that is capable of processing the content of the requesting node is assigned the duties to process the data for the requesting node. As mentioned above, the child node is a node that is capable of processing the content for the requesting node, but the child node has less capabilities than the parent node in accordance with the hierarchy defined by the overlay distribution network tree. The assigned child node will therefore provide the processing requested by the requesting node, and the requesting node will receive the content from the child node that is able to provide the content with the capability level that is at least able to satisfy the requesting node's capabilities.

In broad terms, each parent in the tree is configured to process the content and then provide it to its child, which in turn can process the content for its child.

Figure 6:
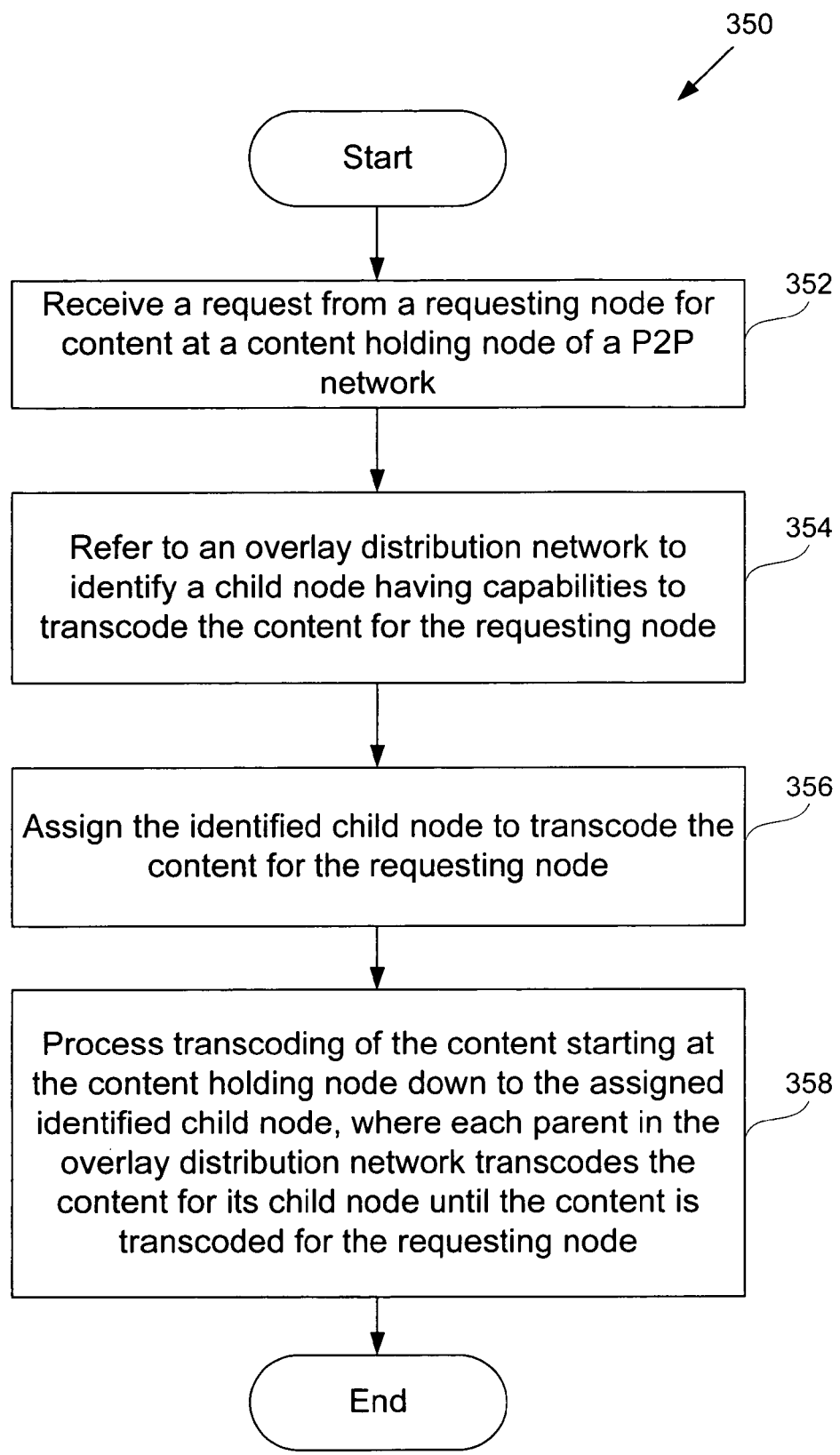

FIG. 6 illustrates a flowchart diagram 350 of a more detailed processing example of using the overlay distribution network in conjunction with a peer-to-peer network. In operation 352, the request from a requesting node is received for content at a content-holding node of a peer-to-peer network. As mentioned above, the content-holding node should be a node that is capable of distributing content to a number of peers and should also be a high capability node. In the example shown in FIG. 1, the high capability node may be the node peer P7. Peer P7 will therefore define the head of the overlay distribution network, and other peers that are also capable of processing the content request by a requesting node may define child nodes of the head node in the overlay distribution network.

In operation 354, reference is made to an overlay distribution network to identify a child node of the content-holding node that is capable of transcoding the content for the requesting node. As mentioned earlier, the child node of the content-holding node should at least be capable of transcoding the content to the requesting node in order for the child node to be assigned the duties to transcode the content for the requesting node. If the child node is able to transcode the content for the requesting node, the method moves to operation 356 where the identified child node is assigned to transcode the content for the requesting node. The identified child node can be at any particular level in the parent-child tree structure of the overlay distribution network.

The lower the identified node is, the lower the capabilities the node will have. However, the identified node must have the capabilities to transcode the content for the requesting node. If the requesting node is a high capability node, a child node may not be able to provide the transcoding services for the requesting node, and therefore the content-holding node (head node), may have to perform the transcoding of content directly to the requesting node. The method now moves to operation 358 where transcoding of the content begins to process at the content-holding node.

At each child level below, each node will also complete a lower level transcoding of the content, until the lowest level assigned child node gets the content and transcodes the content for the requesting node. Thus, each parent in the overlay distribution network transcodes the content for its child node until the content is transcoded directly for the requesting node.

In broad terms, a tree of nodes is constructed to define the overlay network, and each node in the tree is arranged based on capability. The highest node in the tree will have the highest capability. And, the parent nodes in the tree will provide transcoding of content that is to be provided to the child nodes. Each node, if it has children, will also provide transcoding of the content before it is passed to the child node. In some circumstances, a node may be a pass-through node, and no transcoding will occur at that particular node. Thus, in the peer-to-peer network, it is possible to move the transcoding out to lower capability child peers, which are closer in capability to the requesting peer. For instance, if a low capability device, such as a cell phone, requests video content, a lower capability child node can be charged with providing the transcoded content to the requesting cell phone. The upper level nodes also performed transcoding, but only to its immediate child nodes. Thus, the content can be distributed closer to the end users.

This invention is particularly advantageous for streaming high demand content (e.g., video, audio, audio/video, and other data streams) to end users in an efficient manner that is appropriate to the capabilities of each end user. Thus, the overlay network is a capability-aware distribution forest of transcoding nodes, as a self-organizing overlay network of distributed peers. In one additional embodiment, the audio and video streams could be transmitted along the same path in a single overlay. This recognizes that audio is orders of magnitude smaller to transmit and less computationally complex. Thus reuse of the one overlay for both streams is warranted and leads to a major reduction in overlay maintenance.

In another embodiment, the audio and video streams are transmitted along completely separate overlays. This recognizes that the overhead of audio is not as insignificant as we would like, so we need to manage its overlay separately to optimize its processing (transmission and transcoding).

In still another embodiment, a hybrid model, where audio generally will take the same path as video, but can also find its own path at different levels of the hierarchy. This reaps some benefits of overlay maintenance sharing, and also allows audio streams to find mid-tree nodes that are better able to handle lower bandwidth audio, but cannot support even the lowest quality video. It should be noted that this also implies that 1 audio (or video) transcoding node could handle transcoding to N different output formats.

The embodiments of the present invention can further be generalized. In state-of-the-art media presentations, there are many separate streams (referred to as "elementary streams") which can encode audio, video, 3d, 3d animation, static images, etc. All of these are candidates for transcoding. Thus, the single fitness metric that we use to organize each node in the tree would have to be N-fitness metrics. Then, to globally and locally optimize the tree, weight would be given to the most expensive metric (likely to be video) and then organization would continue to optimize proceeding in order through the rest of the N metrics. In the hybrid mode defined above, although a bit more complex, a best balance can be achieved between redundant overlay maintenance overhead and finding optimal paths for each of the various elementary streams. As such, it should be understood that the defined embodiments were only exemplary and can be modified and combined to reach the desired outcome, depending on the type of data being exchanged over the peer-to-peer network.

Embodiments of the present invention may be practiced with various computer system configurations including handheld devices, microprocessor systems, microprocessor-based or programmable consumer electronics, minicomputers, mainframe computers and the like. The invention can also be practiced in distributed computing environments where tasks are performed by remote processing devices that are linked through a wire-based or wireless network.

With the above embodiments in mind, it should be understood that the invention can employ various computer-implemented operations involving data stored in computer systems. These operations are those requiring physical manipulation of physical quantities. Usually, though not necessarily, these quantities take the form of electrical or magnetic signals capable of being stored, transferred, combined, compared and otherwise manipulated.

Any of the operations described herein that form part of the invention are useful machine operations. The invention also relates to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can also be distributed over a network-coupled computer system so that the computer readable code is stored and executed in a distributed fashion.

Although the foregoing invention has been described in some detail for purposes of clarity of understanding, it will be apparent that certain changes and modifications can be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method for structuring a content distribution overlay network for a peer-to-peer network, comprising:
   receiving a request for content at a content node from a requesting node of the peer-to-peer network, the content node having processing capabilities to transcode the content for presentation to the requesting node;
   dynamically assembling an overlay network after receiving the request for content, the overlay network is defined by nodes of the peer-to-peer network and defined from available nodes of the peer-to-peer network that are capable of processing the request and are available at a time of the request, where each available node used for the overlay network is selected based on respective processing capabilities of the available nodes, and the requesting node and the content node being assembled as part of the overlay network, the assembling of the overlay network being self-organizing from nodes of the peer-to-peer network based on the request for content
   using the assembled overlay network,
      referring to a head node of the overlay network to determine if a child node of the content node has processing capabilities to process the content, the content node being the head node in the overlay network; and
      assigning the child node to process the content for presentation to the requesting node if the child node has processing capabilities to transcode the content for the requesting node, wherein the child node has lower processing capabilities to transcode the content than the head node, and the assigned child node is load balanced with respect to other nodes capable of transcoding for the requesting node, wherein the assigned child node has the lowest work load.

2. A method for structuring a content distribution overlay network for a peer-to-peer network as recited in claim 1, wherein the overlay network includes the head node, and the head node includes one or more child nodes, and each of the child nodes in turn is capable of having child nodes to define a multilevel parent-child overlay tree structure that is independent of the peer-to-peer network.

3. A method for structuring a content distribution overlay network for a peer-to-peer network as recited in claim 2, wherein each parent in the multi-level parent-child overlay tree structure provides transcoding for its one or more children.

4. A method for structuring a content distribution overlay network for a peer-to-peer network as recited in claim 1, wherein the head node is a high processing capability node for transcoding the content.

5. A method for structuring a content distribution overlay network for a peer-to-peer network as recited in claim 4, wherein the head node has one or more lower levels of child nodes, and each lower level has less processing capability for transcoding the content than a level above.

6. A method for operating a content distribution overlay network in conjunction with a peer-to-peer network, comprising:
   receiving a request for content at a content node from a requesting node of the peer-to-peer network;
   dynamically assembling an overlay network after receiving the request for content, the overlay network defined by nodes of the peer-to-peer network capable of processing the request and defined from available nodes of the peer-to-peer network at a time of the request, where the assembling of the overlay network is self-organizing from nodes of the peer-to-peer network, each available node used for the overlay network is selected based on respective transcoding bandwidth of the available nodes, and the requesting node and the content node being assembled as part of the overlay network based on the request for content;
   using the assembled overlay network,
      referring to an overlay network to identify the content node as a head node of the overlay network, the head node having transcoding bandwidth to transcode the content, the head node identifies one or more child nodes, and each of the child nodes in turn identifies one or more child nodes having transcoding bandwidth to transcode the content;
      identifying a lowest level child node of the head node that has transcoding bandwidth to transcode the content for the requesting node; and
      assigning the lowest level child node to transcode the content for presentation to the requesting node, wherein each parent in the overlay network is assigned to transcode the content for its child and the lowest level child node receiving the content transcoded from its parent in a format of the lowest level child node, wherein the overlay network is independent of the peer-to-peer network and nodes of the overlay network are arranged according to transcoding bandwidth, where the head node has a highest transcoding bandwidth of the overlay network, wherein the assigned lowest level child node is load balanced with respect to other nodes capable of transcoding for the requesting node, wherein the assigned lowest level child node has the lowest work load.

7. A method for operating a content distribution overlay network in conjunction with a peer-to-peer network as recited in claim 6, wherein the overlay network defines a multilevel parent-child overlay tree structure.

8. A method for operating a content distribution overlay network in conjunction with a peer-to-peer network as recited in claim 6, wherein the head node is a high transcoding bandwidth node for transcoding the content.

9. A method for operating a content distribution overlay network in conjunction with a peer-to-peer network as recited in claim 6, wherein each parent node in the overlay network is assigned a set number of child nodes for which the parent node is capable of providing load-balanced transcoding for the set number of child nodes.

10. A method for operating a content distribution overlay network in conjunction with a peer-to-peer network as recited in claim 6, wherein the overlay network is dynamically adjusted depending on available child nodes that can provide transcoding of the content.

11. A method for operating a content distribution overlay network in conjunction with a peer-to-peer network as recited in claim 6, wherein the multilevel parent-child overlay tree structure is organized based on transcoding bandwidth, and the highest node in the multilevel parent-child overlay tree structure has a higher transcoding bandwidth than the lowest level child node.

12. A method for operating a content distribution overlay network in conjunction with a peer-to-peer network as recited in claim 11, wherein a child node in the multilevel parent-child overlay tree structure is selected for transcoding based on load characteristics of the child node and other child nodes that are capable of providing transcoding for the content.

13. A method for operating a content distribution overlay network in conjunction with a peer-to-peer network as recited in claim 6, wherein the content is either video content, audio content, or both audio and video content, and transcoding transforms the content from one resolution format to another resolution format.

14. A computer readable media including program instructions stored on memory of a computer node connected to a peer-to-peer network, the computer readable media comprising:

program instructions for receiving a request for content at a content node from a requesting node of the peer-to-peer network, the content node having capabilities to transcode the content for presentation to the requesting node;

program instructions for dynamically assembling an overlay network after receiving the request for content, the assembling of the overlay network being self-organizing from nodes of the peer-to-peer network based on the request for content and also based on nodes available at a time of the request and are capable of processing the request;

using the assembled overlay network, processing, program instructions for referring to a head node to determine if a child node of the content node has transcoding bandwidth to transcode the content, the content node being the head node in the overlay network; and program instructions for dynamically assigning the child node to transcode the content for presentation to the requesting node if the child node has transcoding bandwidth to transcode the content for the requesting node, wherein the child node has lower transcoding bandwidth to transcode the content than the head node, wherein the assigned child node is load balanced with respect to other nodes such that the assigned child node capable of transcoding for the requesting node has the lowest work load.

15. A computer readable media including program instructions for structuring a content distribution overlay network for a peer-to-peer network as recited in claim 14, wherein the head node is a high transcoding bandwidth node for transcoding the content.

16. A computer readable media including program instructions for structuring a content distribution overlay network for a peer-to-peer network as recited in claim 15, wherein the head node has one or more lower levels of child nodes, and each lower level has less transcoding bandwidth for processing the content than a level above.

17. A computer readable media including program instructions for structuring a content distribution overlay network for a peer-to-peer network as recited in claim 14, wherein the overlay network includes the head node, and the head node includes one or more child nodes, and each of the child nodes in turn is capable of having child nodes to define a multilevel parent-child overlay tree structure that is independent of the peer-to-peer network.

18. A computer readable media including program instructions for structuring a content distribution overlay network for a peer-to-peer network as recited in claim 17, wherein each parent in the multi-level parent-child overlay tree structure provides transcoding for its one or more children.

\* \* \* \* \*